United States Patent
Sanghvi et al.

(10) Patent No.: US 7,441,024 B2
(45) Date of Patent: *Oct. 21, 2008

(54) METHOD AND APPARATUS FOR APPLYING POLICIES

(75) Inventors: Ashvinkumar J. Sanghvi, Sammamish, WA (US); Howard M. Hance, Snohomish, WA (US); Lev Novik, Bellevue, WA (US); Raxit A. Kagalwala, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

This patent is subject to a terminal disclaimer.

(21) Appl. No.: 11/290,740

(22) Filed: Nov. 30, 2005

(65) Prior Publication Data

US 2006/0080667 A1    Apr. 13, 2006

Related U.S. Application Data

(62) Division of application No. 09/875,374, filed on Jun. 5, 2001, now Pat. No. 7,418,489.

(60) Provisional application No. 60/210,347, filed on Jun. 7, 2000.

(51) Int. Cl.
G06F 15/173    (2006.01)

(52) U.S. Cl. ............... 709/223; 709/220; 719/310; 719/318; 719/321; 719/328

(58) Field of Classification Search ......... 709/220–226; 719/318, 310, 321, 328; 707/10
See application file for complete search history.

(56) References Cited

U.S. PATENT DOCUMENTS

| | | | |
|---|---|---|---|
| 5,655,081 | A | 8/1997 | Bonnell et al. |
| 5,724,589 | A | 3/1998 | Wold |
| 5,872,928 | A | 2/1999 | Lewis et al. |
| 5,889,953 | A | 3/1999 | Thebaut et al. |
| 6,058,416 | A | 5/2000 | Mukherjee et al. |
| 6,154,849 | A | 11/2000 | Xia |
| 6,195,685 | B1 | 2/2001 | Mukherjee et al. |
| 6,243,747 | B1 | 6/2001 | Lewis et al. |
| 6,269,473 | B1 | 7/2001 | Freed et al. |
| 6,275,232 | B1 | 8/2001 | Cataudella et al. |

(Continued)

OTHER PUBLICATIONS

Abstract for "Integrated Network Management VI. Distributed Management for the Networked Millenium", Proceedings of the Sixth IFIP/IEEE International Syposium on Integrated Network Management, May 24-28, 1999.

(Continued)

*Primary Examiner*—Nathan J Flynn
*Assistant Examiner*—Mohammad A Siddiqi
(74) *Attorney, Agent, or Firm*—Lee & Hayes, PLLC

(57) ABSTRACT

A policy handling system creates multiple policies and associates each of the multiple policies with at least one target node in an enterprise. The system then applies each of the multiple policies to the appropriate target node. The multiple policies can be event-handling policies. Each policy can be associated with a group of target nodes in which the group of target nodes share a common relationship. Domain controllers receive the multiple policies and apply the policies to the appropriate target nodes. A meta-policy is used to control the application of the multiple policies to the proper target nodes.

4 Claims, 8 Drawing Sheets

U.S. PATENT DOCUMENTS

| | | | |
|---|---|---|---|
| 6,275,323 | B1 | 8/2001 | Fukushima |
| 6,381,639 | B1 | 4/2002 | Thebaut et al. |
| 6,466,932 | B1 | 10/2002 | Dennis et al. |
| 6,470,384 | B1 | 10/2002 | O'Brien et al. |
| 6,473,851 | B1 | 10/2002 | Plutowski |
| 6,502,131 | B1 * | 12/2002 | Vaid et al. ............... 709/224 |
| 6,584,502 | B1 | 6/2003 | Natarajan et al. |
| 6,678,835 | B1 | 1/2004 | Shah et al. |
| 6,708,187 | B1 | 3/2004 | Shanumgam et al. |
| 6,748,455 | B1 | 6/2004 | Hinson et al. |
| 6,766,368 | B1 | 7/2004 | Jakobson et al. |
| 6,799,208 | B1 | 9/2004 | Sankaranarayan et al. |
| 6,826,698 | B1 | 11/2004 | Minkin et al. |
| 6,829,770 | B1 | 12/2004 | Hinson et al. |
| 6,854,122 | B1 | 2/2005 | Sheriff et al. |
| 6,865,549 | B1 | 3/2005 | Connor |
| 6,898,654 | B1 | 5/2005 | Senior et al. |
| 6,983,317 | B1 | 1/2006 | Bishop et al. |
| 7,003,578 | B2 * | 2/2006 | Kanada et al. ............ 709/230 |
| 7,051,365 | B1 * | 5/2006 | Bellovin ................... 726/11 |
| 7,171,459 | B2 | 1/2007 | Sanghvi et al. |
| 7,315,826 | B1 * | 1/2008 | Guheen et al. ............. 705/7 |
| 2001/0049086 | A1 | 12/2001 | Paquette et al. |
| 2002/0016840 | A1 | 2/2002 | Herzog et al. |
| 2002/0019945 | A1 | 2/2002 | Houston et al. |
| 2005/0044554 | A1 | 2/2005 | Hinson et al. |

OTHER PUBLICATIONS

Abstract for "Applying configurable event-triggered services in heterogeneous, distributed information systems", Koschel et al., Proceedings of EFIS '99: Second International Workshop on Engineering Federated Information Systems, May 5-7, 1999. pp. 147-157.

"CIM II: The Integrated Enterprise", Lopes, P., Society of Manufacturing Engineers, Technical Paper, MS92-322, 1992, pp. 21-1 to 21-5, and 21-7.

"A geographically distributed enterprise simulation system", Ammerlahn et al., Future Generation Computer Systems 17, 2000, pp. 135-146.

"Hot Topics in Network Management", Malek, M., NOMS 2000, 2000 IEEE/IFIP Networks Operations and Management Symposium, 2000, 2 pages.

"Business rules", Odell, J., Object Magazine, Jan. 1995, pp. 53-56.

"Integration of Simulation with Enterprise Models", Srinivasan et al., Proceedings of the 1997 Winter Simulation Conference, pp. 1352-1356.

"A Process Oriented Method for the Reuse of CIM Models", Janusz, B., IFAC Manufacturing Systems: Modelling, Management and Control, 1997, pp. 219-224.

"Simulation of Business Processes in an Enterprise Modelling System", Pardasani et al., Proceedings of the SCSC, Jul. 24-26, 1995, pp. 440-445.

"A Messaging-Based Architecture for Enterprise Application Integration", Joseph, T., IEEE, Proceedings of the 15th International Conference on Data Engineering, Mar. 23-26, 1999, pp. 62-62.

"Bespa: a Event-based Mediation Mechanism for Systems Collaboration", Kajihara et al., NTT Software Laborations, NTT R&D, vol. 46, No. 1997, pp. 45-50.

"SMS: A Desktop Manager for the Enterprise?", Corcoran C., Datamation, Mar. 15, 1996, pp. 71-72.

"Process-based Definition of Enterprise Models", Burkhart, R., Enterprise Integration Modeling, Proceedings of the First International Conference, 1992, pp. 229-238.

Troubleshooting Group Policy in Windows 2000, Published by Microsoft Corporation, published in 2000.

Windows 2000 Active Directory by Alistair G. Lowe-Norris, Published by O'Riely, 1st edition Jan. 2000.

* cited by examiner

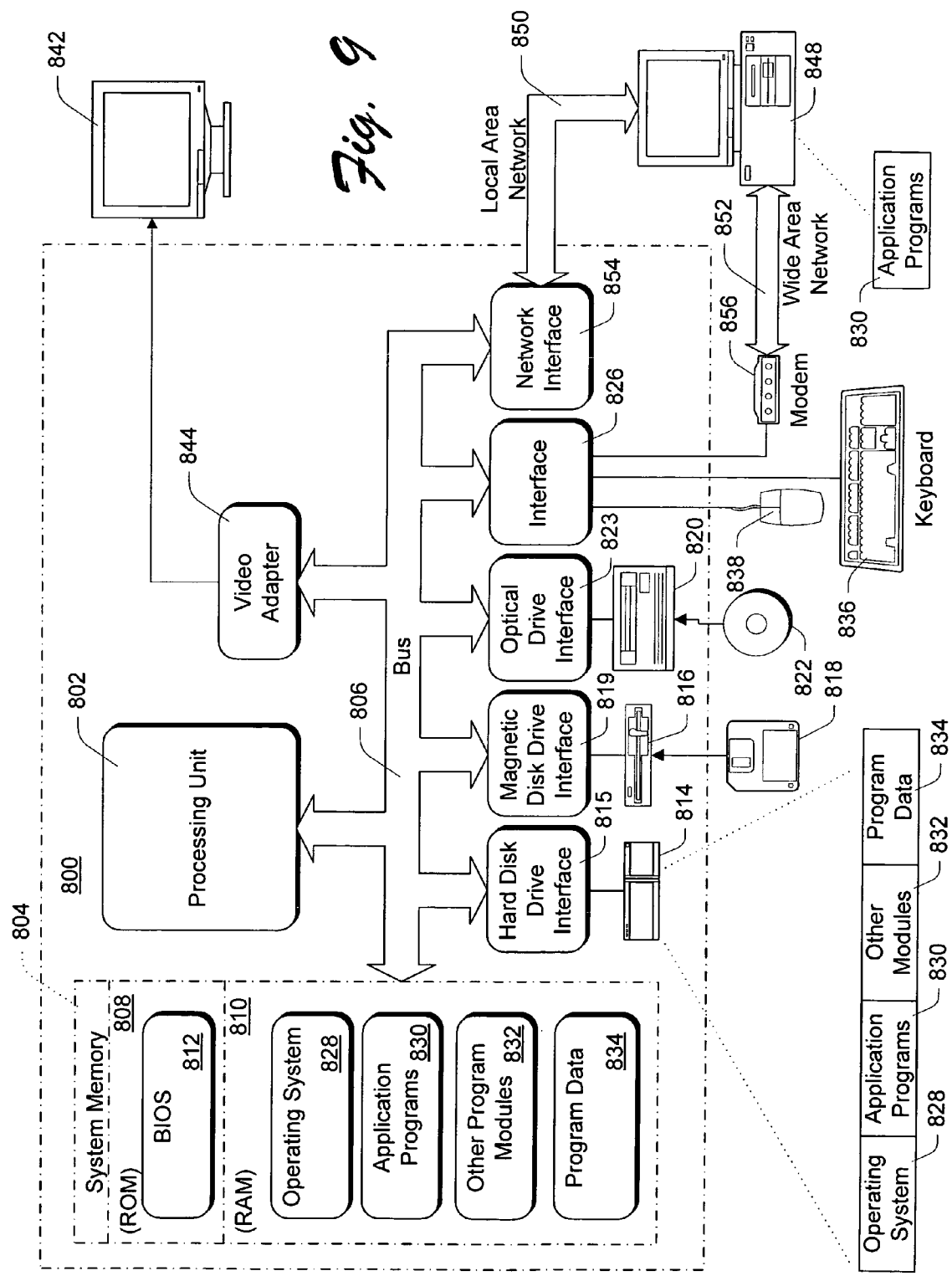

METHOD AND APPARATUS FOR APPLYING POLICIES

RELATED APPLICATIONS

This application is a Divisional of application Ser. No. 09/875,374, filed Jun. 5, 2001, entitled "Method and Apparatus for Applying Policies", (which issued as U.S. Pat. No. 7,418,489 on Aug. 26. 2008) and incorporated herein by reference.

That co-pending application claims the benefit of U.S. Provisional Application No. 60/210,347 filed Jun. 7, 2000, the disclosure of which is incorporated by reference herein That co-pending application is related to application Ser. No. 09/875,814, filed Jun. 5, 2001, entitled "Method and Apparatus for Handling Policies In an Enterprise", (which issued as U.S. Pat. No. 7,171,459 on Jan. 30, 2007) and is related to co-pending application Ser. No. 09/875,798, filed Jun. 5, 2001, entitled "Method and Apparatus for Event Handling In an Enterprise".

TECHNICAL FIELD

The present invention relates to computing systems and, more particularly, to the distribution and handling of various policies throughout a computing environment.

BACKGROUND

Computer systems, such as servers and desktop personal computers, are expected to operate without constant monitoring. These computer systems typically perform various tasks without the user's knowledge. When performing these tasks, the computer system often encounters events that require a particular action (such as logging the event, generating an alert for a particular system or application, or performing an action in response to the event). Various mechanisms are available to handle these events.

A computing enterprise typically includes one or more networks, services, and systems that exchange data and other information with one another. The enterprise may include one or more security mechanisms to safeguard data and authenticate users and may utilize one or more different data transmission protocols. At any particular time, one or more networks, services or systems may be down (e.g., powered down or disconnected from one or more networks). Networks, services or systems can be down for scheduled maintenance, upgrades, overload or failure. Application programs attempting to obtain event data must contend with the various networks, services, and systems in the enterprise when they are down. Additionally, application programs must contend with the security and network topology limitations of the enterprise as well as the various protocols used in the enterprise.

Existing operating system components, services, and applications generate a variety of different events. A set of event-handling policies are typically defined to describe how a particular component, service, or application responds to a particular event. In a computing environment having a large number of components, services, and applications, it may be necessary to define these policies for each of the individual components, services, and applications, even though the same policy may be used with multiple components, services, or applications. This situation results in the repeated entry of similar or identical policy information throughout the computing environment. In a large computing environment, this repeated entry of similar policy information is tedious and requires a significant amount of time by administrators or other personnel. Additionally, each time a new policy is added or an existing policy is modified, the same changes may be required on other components, services, or applications, thereby increasing the burden of modifying policies or adding new policies.

The system and method described herein addresses these limitations by providing a standardized system and method to handle various policies in a computing enterprise.

SUMMARY

The systems and methods described herein provide for the distribution and processing of policies throughout an enterprise. The systems and methods simplify the process of applying policies to various components, services, and applications in the enterprise. Additionally, the systems and methods described herein simplify the tasks associated with applying new policies or modifying existing policies in the enterprise. Rather than entering similar policy information for multiple components, services, or applications in an enterprise, an administrator can enter the policy information once and propagate that information to all components, services, or applications that utilize the policy. This standardized policy handling simplifies policy management in an enterprise and reduces the redundant entry of information when applying or modifying policies that are associated with multiple components, services, or applications.

In one embodiment, multiple policies are created and associated with at least one target node. Each of the multiple policies are applied to the target node.

In a described embodiment, each of the multiple policies are associated with a group of target nodes in an enterprise. The group of target nodes share a common relationship, such as a common geographic location or being coupled to a common network.

In a particular embodiment, each of the multiple policies are provided to a series of domain controllers. The domain controllers apply the multiple policies to the target nodes.

In another embodiment, a meta-policy controls the application of policies to the target nodes.

BRIEF DESCRIPTION OF THE DRAWINGS

FIG. 9 illustrates an example of a suitable operating environment in which the event distribution and event handling system and method may be implemented.

DETAILED DESCRIPTION

Figure 1:
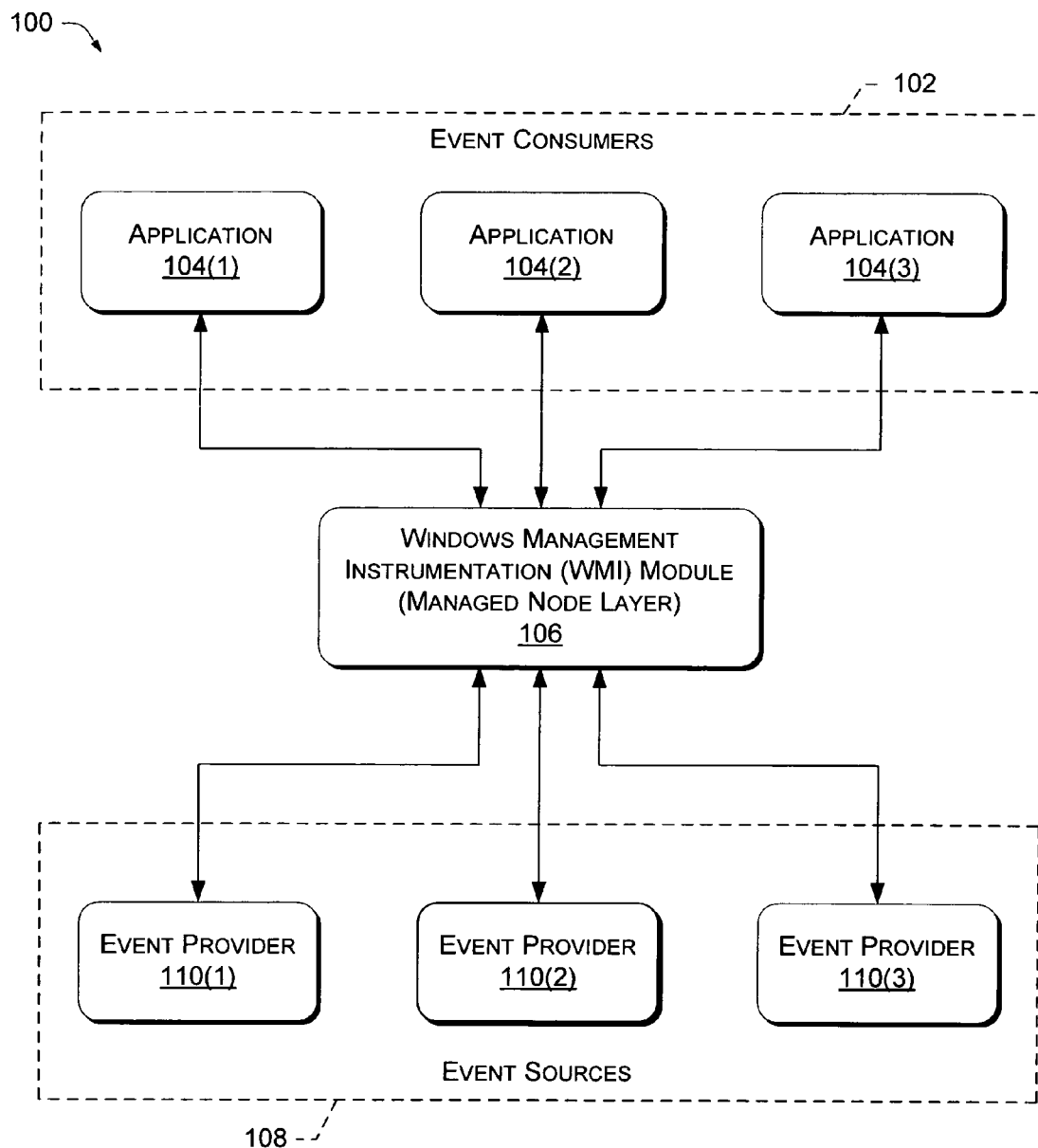
FIG. 1 illustrates a block diagram of a system that receives event information from multiple event providers and provides event information to multiple event consumers.

The systems and methods described herein provide for the simplified handling of policies in an enterprise. An enterprise-wide policy infrastructure provides a common mechanism for defining, applying, and modifying various policies throughout the enterprise. The policy infrastructure also allows administrators to control when and how certain policies are handled using meta-policies. Policies can be applied to groups of components, services, or applications such that the administrative tasks of applying or modifying policies is simplified.

Web-Based Enterprise Management (WBEM) provides uniform access to management information throughout an enterprise. WBEM is an industry initiative to develop technology for accessing management information in an enterprise environment. This management information includes, for example, information on the state of system memory, inventories of currently installed client applications, and other information related to the status of the system. A particular embodiment of the event-handling system is implemented using Windows® Management Instrumentation (WMI) developed by Microsoft Corporation of Redmond, Wash., which provides an infrastructure to handle various events generated by event sources throughout an enterprise.

WMI technology enables systems, applications, networks, and other managed components to be represented using the Common Information Model (CIM) designed by the Distributed Management Task Force (DMTF). CIM is an extensible data model for representing objects that exist in typical management environments. CIM is able to model anything in the managed environment, regardless of the location of the data source. The Managed Object Format (MOF) language is used to define and store modeled data. In addition to data modeling, WMI provides a set of base services that include query-based information retrieval and event notification. Access to these services and to the management data is provided through a single programming interface. WMI classes define the basic units of management. Each WMI class is a template for a type of managed object. For example, Win32_DiskDrive is a model representing a physical disk drive. For each physical disk drive that exists, there is an instance of the Win32_DiskDrive class. WMI classes may contain properties, which describe the data of the class and methods, which describe the behavior of the class.

WMI classes describe managed objects that are independent of a particular implementation or technology. WMI includes an eventing subsystem that follows the publish-subscribe model, in which an event consumer subscribes for a selection of events (generated by one or more event providers) and performs an action as a result of receiving the event. WMI also provides a centralized mechanism for collecting and storing event data. This stored event data is accessible by other systems via WMI tools and/or application programming interfaces (APIs).

Although particular embodiments are discussed herein as using WMI, alternate embodiments may utilize any enterprise management system or application, whether web-based or otherwise. The event providers and event consumers discussed herein are selected for purposes of explanation. The teachings of the present invention can be used with any type of event provider and any type of event consumer. Additionally, the event-handling system and method described herein can be applied to any type of enterprise or other arrangement of computing devices, applications, and/or networks.

FIG. 1 illustrates a block diagram of a system 100 that receives event information from multiple event sources 108 (i.e., event providers) and provides event information to multiple event consumers 102 (i.e., the users of the event data). System 100 includes a WMI module 106, which receives event data from multiple event sources 108 and receives requests for information (e.g., notification of particular events) from multiple event consumers 102. Event sources 108 may include, for example, managed nodes or managed systems in a network. The multiple event sources are identified as event providers 110. The multiple event consumers are identified as applications 104.

WMI module 106 shown in FIG. 1 represents the managed node layer of the WMI module. As discussed below, the WMI module 106 may also include a central store layer, which may include user interface functionality. The different layers of WMI module 106 manage different types of activities and/or perform different types of functions.

Event providers 110 include, for example, systems, services or applications that generate event data. An exemplary event provider is a disk drive (or an application that monitors the status of a disk drive). The disk drive may generate an event indicating the available storage capacity on the disk drive or indicating the amount of data currently stored on the disk drive. The disk drive may also generate an event indicating that the disk drive is nearly full of data (e.g., when ninety-five percent or more of the disk drive's capacity is used).

Event consumers 102 may request to be notified of certain events (also referred to as "subscribing" to an event). An example event consumer is an application that manages multiple storage devices in an enterprise. The application may request to receive events generated by any of the disk drives or other storage devices in the enterprise. The application can use this event information to distribute storage tasks among the multiple storage devices based on the available capacity of each device and/or the quantity of read or write requests received by each storage device.

Figure 2:
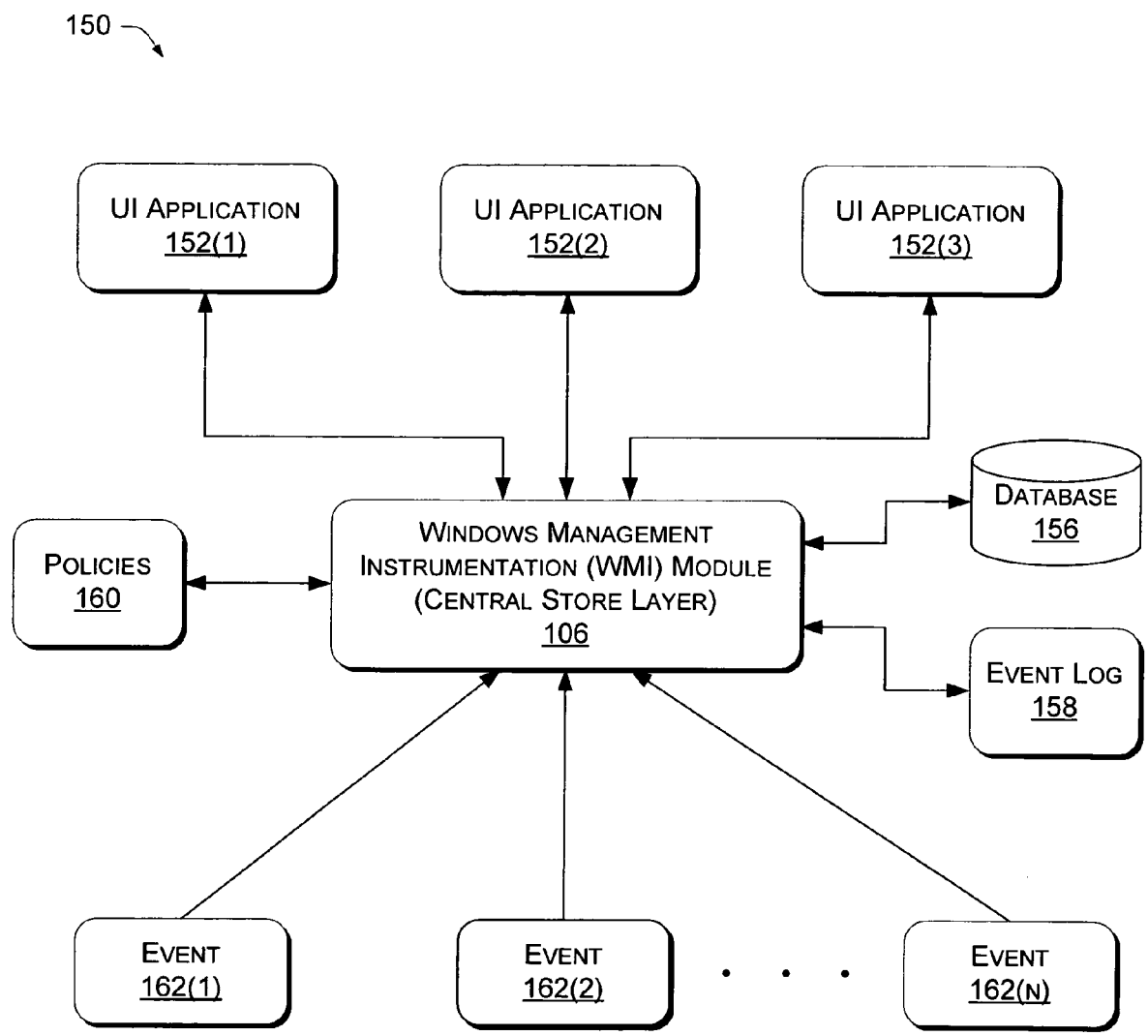
FIG. 2 illustrates a block diagram of a system that receives events and logs those events to an event log.

FIG. 2 illustrates a block diagram of a system 150 that receives events and logs those events to an event log. System 150 includes a central store layer of WMI module 106, which is coupled to multiple user interface (UI) applications 152. UI applications 152 are used to access WMI module 106 to retrieve data, manage systems, and configure various enterprise management parameters. The central store layer of WMI module 106 provides for the centralized logging and storage of event data received from various nodes and various networks in an enterprise. WMI module 106 is also coupled to receive events 162 from one or more event sources. For example, events may be received from the managed node layer of WMI module 106, discussed above with respect to FIG. 1, from an event forwarding application (e.g., application 104), or from one or more event providers (e.g., event provider 110).

System 150 also includes a set of policies 160, which are accessible by WMI module 106. Policies 160 may control the configuration of one or more systems in the enterprise. Other policies may define various activities, such as event filtering, event correlation, and the forwarding of events to particular devices or applications. A database 156 is coupled to WMI module 106. Database 156 stores various information related to the enterprise. For example, database 156 can store event data (i.e., creating an event log), policy data, and enterprise configuration information.

WMI module 106 is also coupled to an event log 158. The event log 158 uses WMI features to provide a distributed architecture that is capable of selecting, filtering, correlating, forwarding, storing, and delivering event data in an enterprise. The event log 158 allows users, such as administrators, to request data related to a particular event, request data from a particular node or device in the enterprise, define the manner in which events are correlated with one another, define how certain events should be forwarded, and define how to store event data. Data requests may be accessed from the event log 158 using, for example, a particular UI application 152. The event log 158 uses an event provider model that allows an application, device or driver to generate events.

The event log 158 provides a policy-based administration of the enterprise. The policy infrastructure allows administrators to set a policy in the Directory Service (DS) and the WMI module ensures that the proper set of WMI objects (e.g., filters, bindings, correlators, consumers, and configuration objects) are delivered to the proper devices or applications in the enterprise.

Table 1 below identifies various types of event providers available in a particular embodiment. Additionally, the table includes a description of the events generated by each event provider. For example, the Win32 Provider generates events that include information related to the operating system, computer system, peripheral devices, file systems, and security for a particular device (such as a computer system) in the enterprise.

TABLE 1

| Event Provider | Description of Events Provided |
|---|---|
| Win32 Provider | Supplies information about the operating system, computer system, peripheral devices, file systems, and security. |
| WDM Provider | Supplies low-level Windows Driver Model (WDM) information for user input devices, storage devices, network interfaces, and communications ports. |
| Event Log Provider | Allows the reading of Windows NT event log entries, controls the configuration of event log administrative options, and event log backup. |
| Registry Provider | Allows registry keys to be created, read, and written. WMI events can be generated when specified Registry keys are modified. |
| Performance Counter Provider | Exposes the raw performance counter information used to compute various performance values. |
| Active Directory Provider | Acts as a gateway to information stored in Microsoft Active Directory services. Allows information from both WMI and Active Directory to be accessed using a single API. |
| Windows Installer Provider | Supplies information about applications installed with the Windows Installer. |
| SNMP Provider | Acts as a gateway to systems and devices that use SNMP for management. Allows SNMP traps to be automatically mapped to WMI events. |

Figure 3:
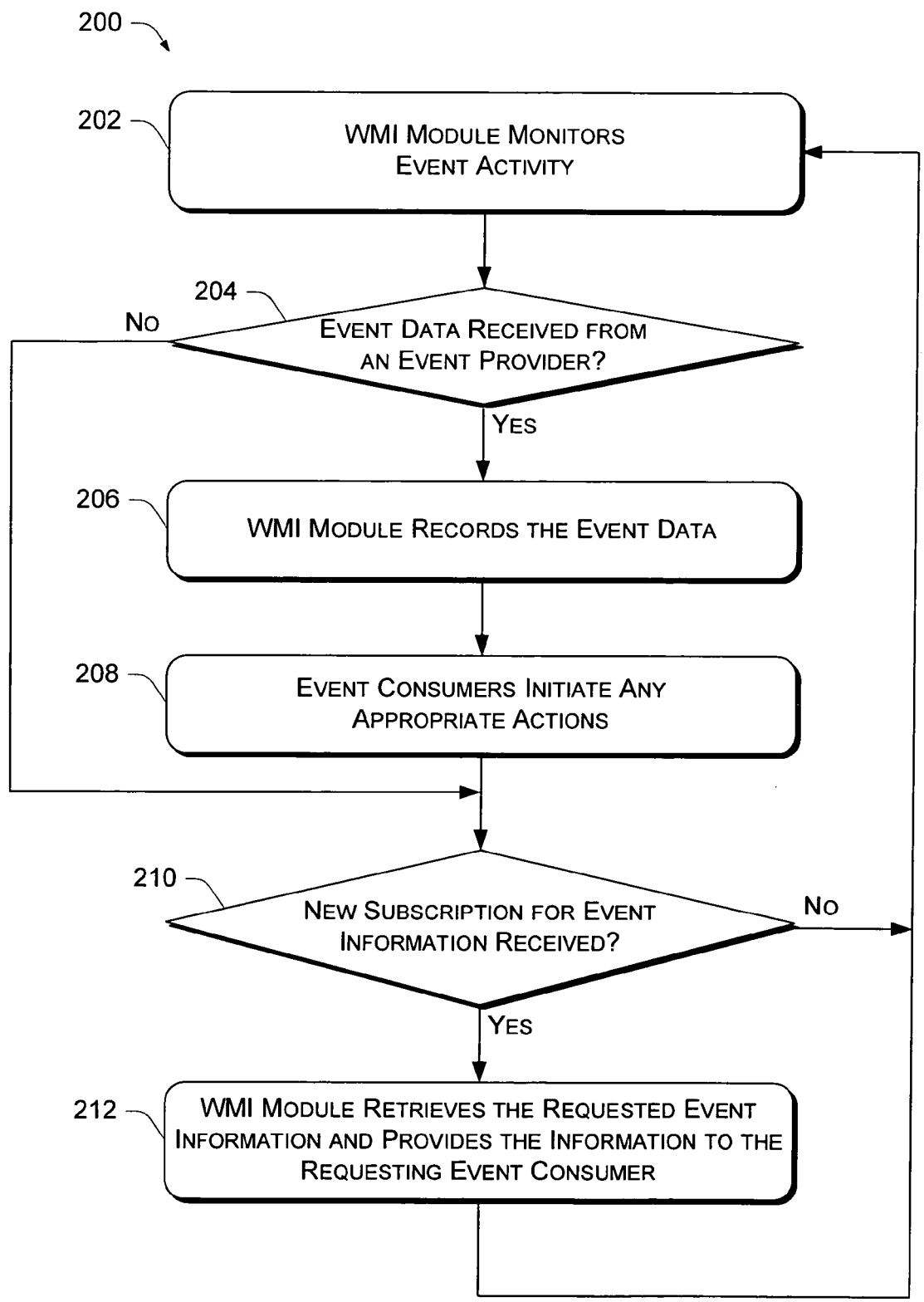
FIG. 3 is a flow diagram illustrating an event-handling procedure.

FIG. 3 is a flow diagram illustrating an event-handling procedure 200. The WMI module monitors event activity throughout the enterprise (block 202). The procedure 200 determines whether event data has been received from an event provider (block 204). If event data has been received, the WMI module records the event data (block 206). Additionally, one or more event consumers (including the WMI module) initiates any appropriate actions (block 208). Example actions include notifying another event consumer of the event or generating an email message related to the event.

At block 210, the procedure 200 determines whether a new subscription for event information has been received. The procedure 200 may also determine whether a request to revise an existing subscription has been received. If a new subscription (or a revised subscription) is received, the procedure continues to block 212 where the WMI module retrieves the requested event information and provides the information to the requesting event customer. Alternatively, the procedure may log the subscription request and notify the requesting event consumer when the next event is received that qualifies under the consumer's subscription request.

Figure 4:
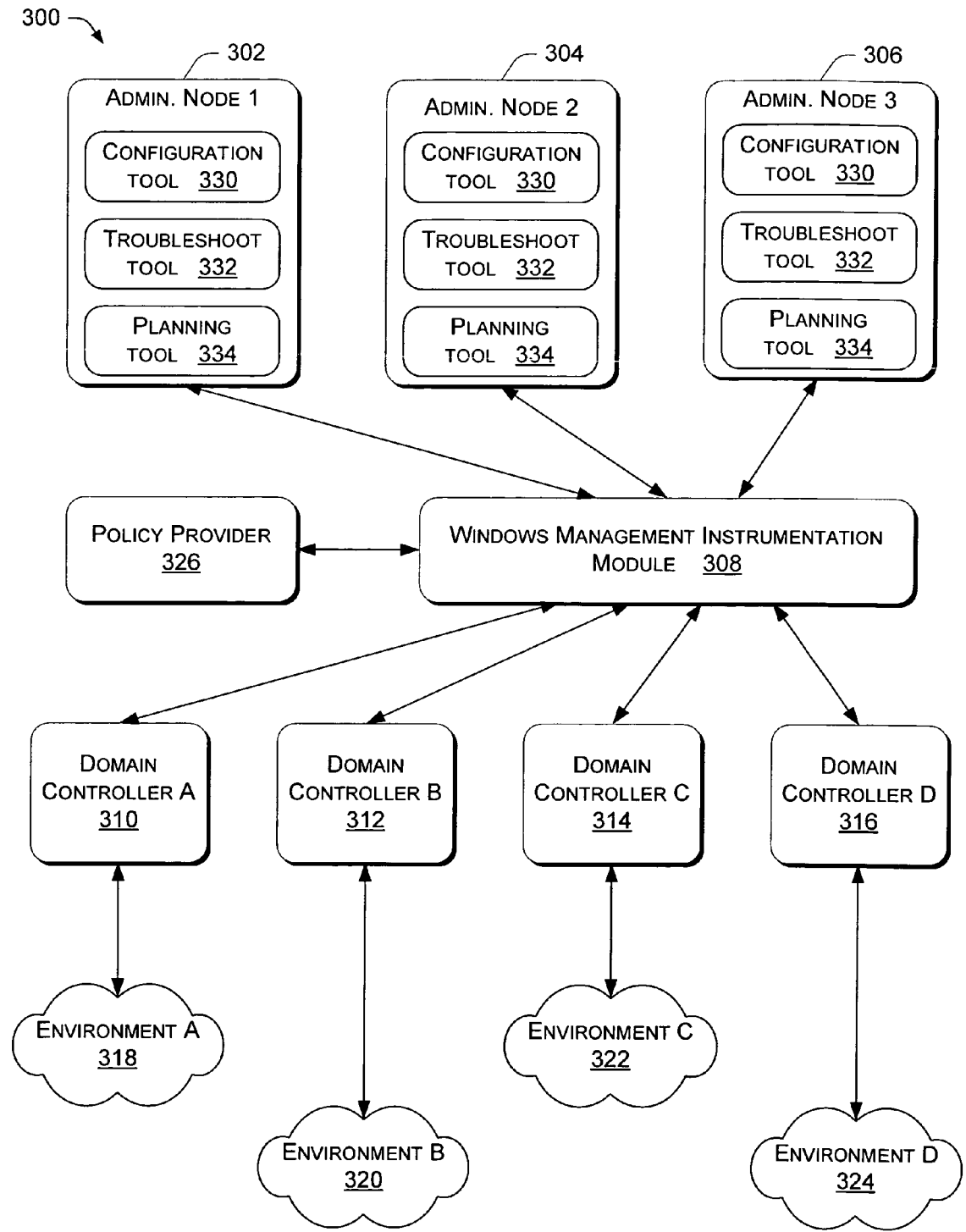
FIG. 4 illustrates a block diagram of a system that handles the creation and application of policies to various targets in an enterprise.

FIG. 4 illustrates a block diagram of a system 300 that handles the creation and application of policies to various targets (e.g., target nodes) in an enterprise. The example system 300 includes three administrator nodes 302, 304, and 306, each of which is coupled to a WMI module 308. The administrator nodes 302, 304, and 306 may be accessed by an administrator (or other user) and allow the administrator to define, create, distribute, and monitor various policies in the enterprise. A particular administrator may use an administrative node to create and distribute policies throughout the entire enterprise or may handle the creation and distribution of policies in a particular area of the enterprise (e.g., a particular network, a particular department, or a particular geographic location). A policy provider 326 is also coupled to WMI module 308 and assists with the handling of policies in the enterprise.

Four separate domain controllers 310, 312, 314, and 316 are coupled to WMI module 308. Each domain controller 310, 312, 314, and 316 is associated with a particular environment 318, 320, 322, and 324, respectively. The domain controllers 310, 312, 314, and 316 store policy information that is applied to one or more target nodes in the enterprise. Typically, each domain controller is responsible for providing policies to its associated environment. However, policies may be replicated across all domain controllers such that any domain controller is capable of providing any policy to a target node. As discussed below, each environment typically includes multiple nodes, such as components, services, and applications. These nodes may also be referred to as "targets" or "target nodes" (i.e., the target (or recipient) of a particular policy or set of policies).

Each administrator node 302, 304, and 306 includes a configuration tool 330, a troubleshoot tool 332, and a planning tool 334. Configuration tool 330 communicates with domain controllers 310, 312, 314, and 316 to configure individual nodes as well as groups of nodes in the enterprise. Configuration tool 330 allows an administrator to define and create policies that will be applied to one or more target nodes and allows the administrator to modify or delete existing policies in the enterprise. Troubleshoot tool 332 allows the administrator to identify problems with policies or particular nodes, such as a failed attempt to apply a policy to a particular target node. Planning tool 334 uses a simulation engine to see the effects on the policies or operation of one or more target nodes if a particular policy change is implemented (e.g., modification or deletion of an existing policy, or creation of a new policy). Instead of actually implementing the change, planning tool 334 applies the proposed change to the simulation engine to determine the results. If the results are acceptable, the proposed change may be implemented by the configuration tool 330. In one embodiment, the simulation engine is located in the administrator node that is performing the simulation.

Although FIG. 4 illustrates an exemplary system 300 having three administrator nodes 302, 304, and 306, and four domain controllers 310, 312, 314, and 316, alternate embodiments may contain any number of administrator nodes and any number of domain controllers. Further, a particular domain controller may be associated with two or more environments and a particular environment can be associated with two or more different domain controllers.

Figure 5:
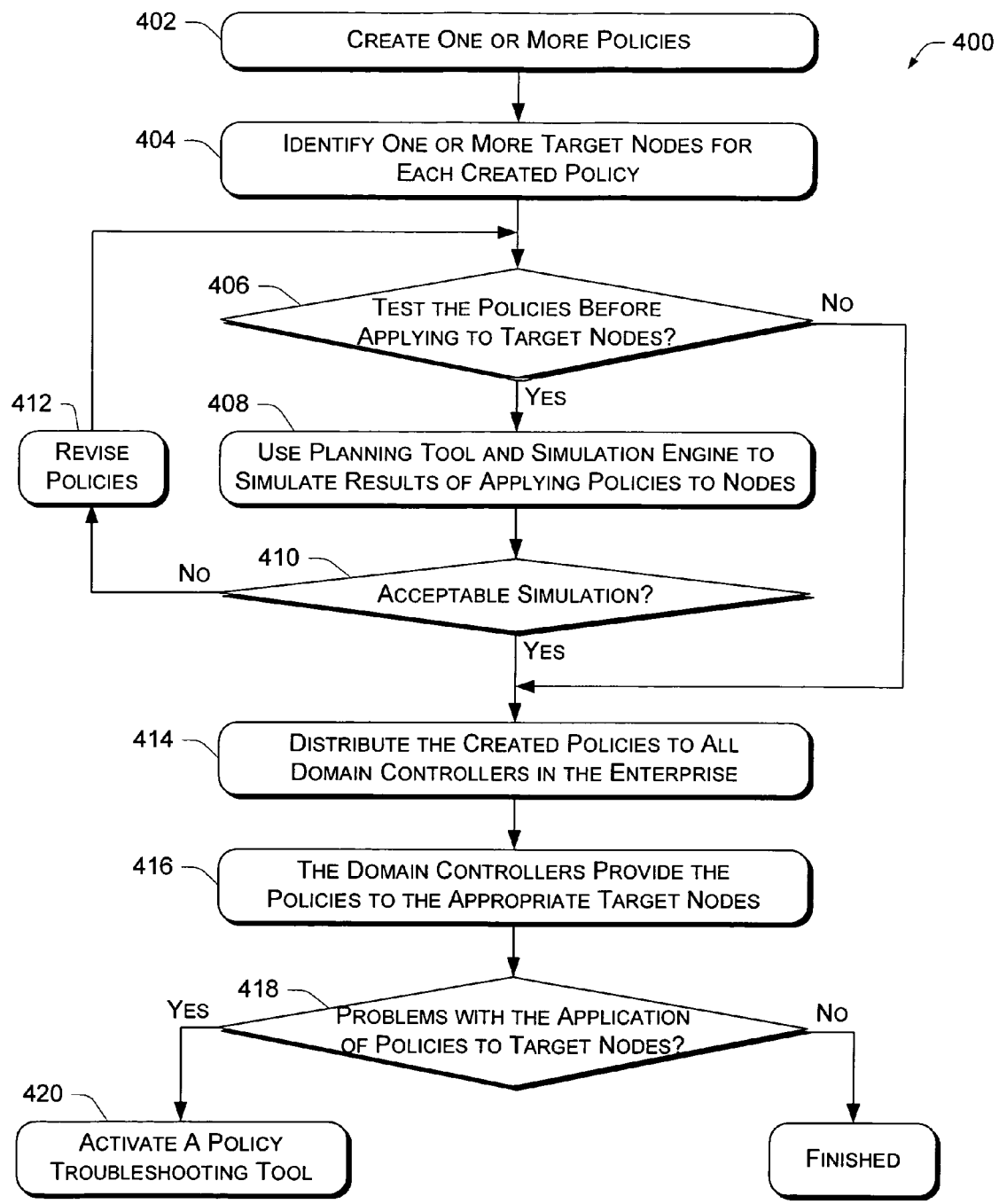
FIG. 5 is a flow diagram illustrating a procedure for creating and applying policies in the system of FIG. 4.

FIG. 5 is a flow diagram illustrating a procedure 400 for creating and applying policies in the system of FIG. 4. Initially, an administrator creates one or more policies (block 402). These policies can be created, for example, using the configuration tool 330 shown in FIG. 4. Certain policies contain information that is known by one or more target nodes in the enterprise. For example, a particular policy may involve the operation of a modem. A target node knows its configuration, including whether the target node contains a modem. In this example, the particular policy is not applied to target nodes that do not contain a modem because the policy is not relevant to those target nodes. In a particular embodiment, target nodes retrieve policies that are relevant to the target node's configuration. In the example above, target nodes that do not contain a modem will not attempt to retrieve policies that relate to nodes containing modems. Thus, the target nodes are at least partially responsible for selecting the appropriate policies to retrieve based on the target node's knowledge of its own configuration and settings.

Next, the administrator identifies one or more target nodes for each created policy (block 404). For example, a particular policy may be intended to be applied to a particular target node or a group of nodes. Other policies may be enterprise-wide policies that are applied to all nodes in an enterprise.

After creating the policies and identifying target nodes associated with each policy, the administrator determines whether to test the policies before applying the policies to the target nodes (block 406). If the policies are to be tested, a planning tool (such as planning tool 334 in FIG. 4) is used along with a simulation engine to simulate the results of applying the new or modified policies to the target nodes (block 408). Block 410 then determines whether the results of the simulation are acceptable (e.g., no errors or serious conflicts between multiple policies applied to the same target node). If the simulation results are not acceptable, then the policies are revised (block 412) in an effort to eliminate the problems or potential problems identified during the simulation. The procedure 400 then returns to block 406 to determine whether to test the revised policies. A configuration tool and/or a troubleshooting tool can be used by an administrator to revise the policies.

If the simulation was determined to be acceptable in block 410 or testing was not performed, the procedure 400 continues at block 414, which distributes the created policies to all domain controllers in the enterprise (e.g., domain controllers 310, 312, 314, and 316 in FIG. 4). The domain controllers then provide the policies to the appropriate target nodes (block 416). After applying the policies to the target nodes, the procedure determines whether any problems occurred during the application of the policies (block 418). If no problems or errors were detected, then the procedure is complete. If a problem or error was detected, then the procedure activates a troubleshooting tool (block 420), which allows the administrator to identify the cause of the problem or error. After identifying the cause of the problem, the administrator can revise or delete one or all of the policies and attempt to reapply the policies to the target nodes.

Figure 6:
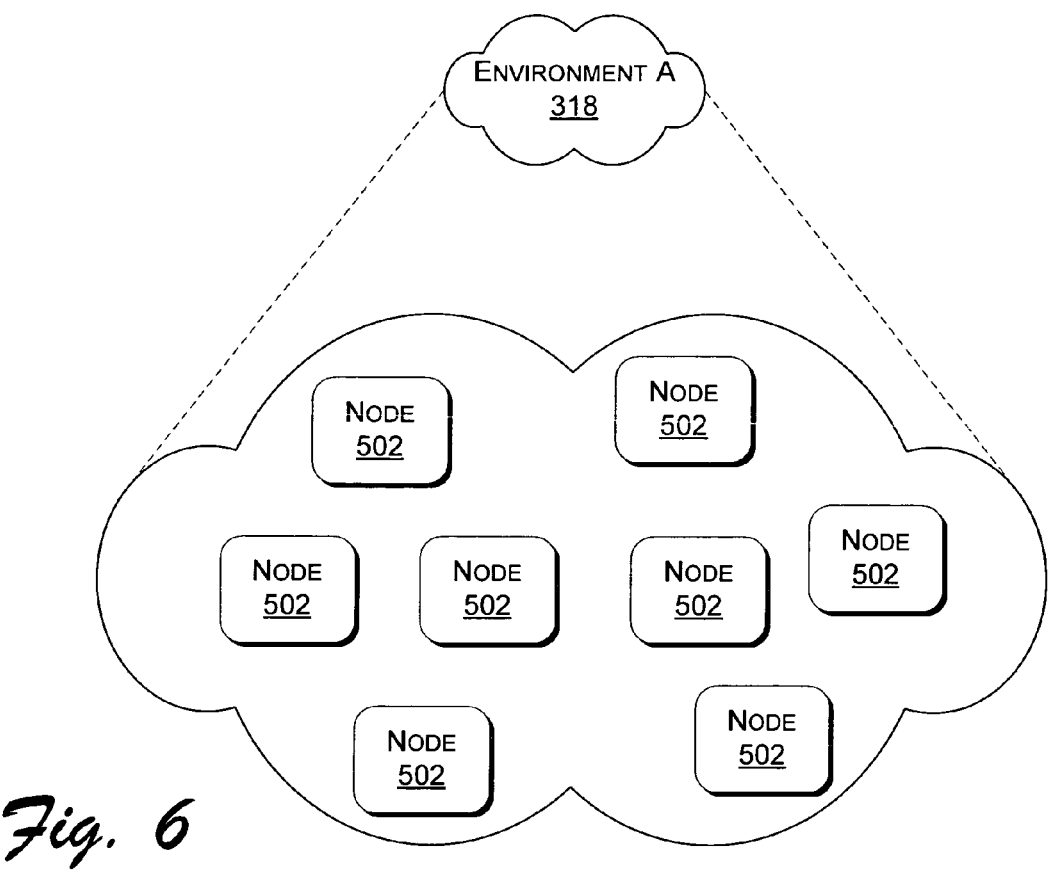
FIG. 6 illustrates an exemplary environment having multiple nodes.

FIG. 6 illustrates an exemplary environment having multiple nodes 502. Each of the nodes 502 may be a component, a service, or an application. Two or more nodes 502 can be treated as a "group". A group of nodes may receive the same set of policies, thereby simplifying the creation of policies by the administrator. For example, instead of indicating that a particular policy applies to each node in the group, the administrator applies the policy to the group, which causes the policy to be applied to each node in the group. In the example of FIG. 6, the environment contains eight nodes 502. However, alternate environments may contain any number of nodes. A group of nodes may be dynamic, such that the members of the group may change based on various parameters or conditions. For example, a "modem group" may include all nodes that contain a modem. If a particular node's modem is removed, it will no longer be a member of the "modem group". In this example, the members of the "modem group" can change without requiring any action by the administrator. The group of nodes share a common relationship (e.g., each node contains a modem, each node is in a particular geographic area, or each node is coupled to a particular network).

Figure 7:
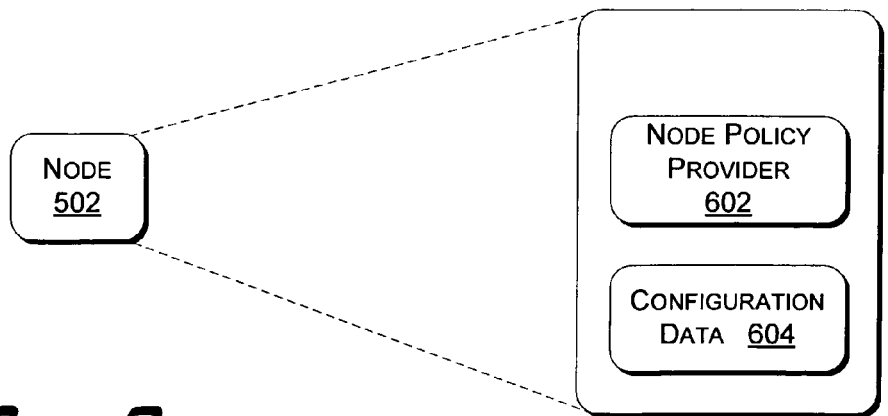
FIG. 7 illustrates an example node that includes a node policy provider and configuration data.

FIG. 7 illustrates an example node 502 that includes a node policy provider 602 and configuration data 604. Configuration data 604 identifies groups, policies, and other node configuration information associated with node 502. Node policy provider 602 is similar to policy provider 326 discussed above. Policy provider 326 (FIG. 4) provides various policy information to the WMI module 308 and handles policies that are applied throughout the enterprise. Node policy provider 602 is a component that executes on node 502 and may be called by other components or procedures to handle policies related to that node. For example, a troubleshooting tool may query node policy provider 602 to determine the results of a recent application of one or more policies to the node 502. The node policy provider 602 responds with information regarding any errors or conflicting policies that were applied to the node 502. If conflicting policies were applied, then node policy provider 602 may have resolved the conflict. The resolution (or lack of resolution) of conflicts is also reported to the troubleshooting tool.

A particular node generally retrieves multiple policies from one or more sources. For example, a particular node may retrieve policies from an associated domain controller. The node policy provider 602 identifies policies stored on the domain controller that apply to the particular node and disregards policies that do not apply to the particular node. The node policy provider 602 then merges all applicable policies together to simplify application of the policies by the node policy provider. If two or more policies are in conflict with one another, the node policy provider 602 resolves the conflict prior to merging the policies.

Figure 8:
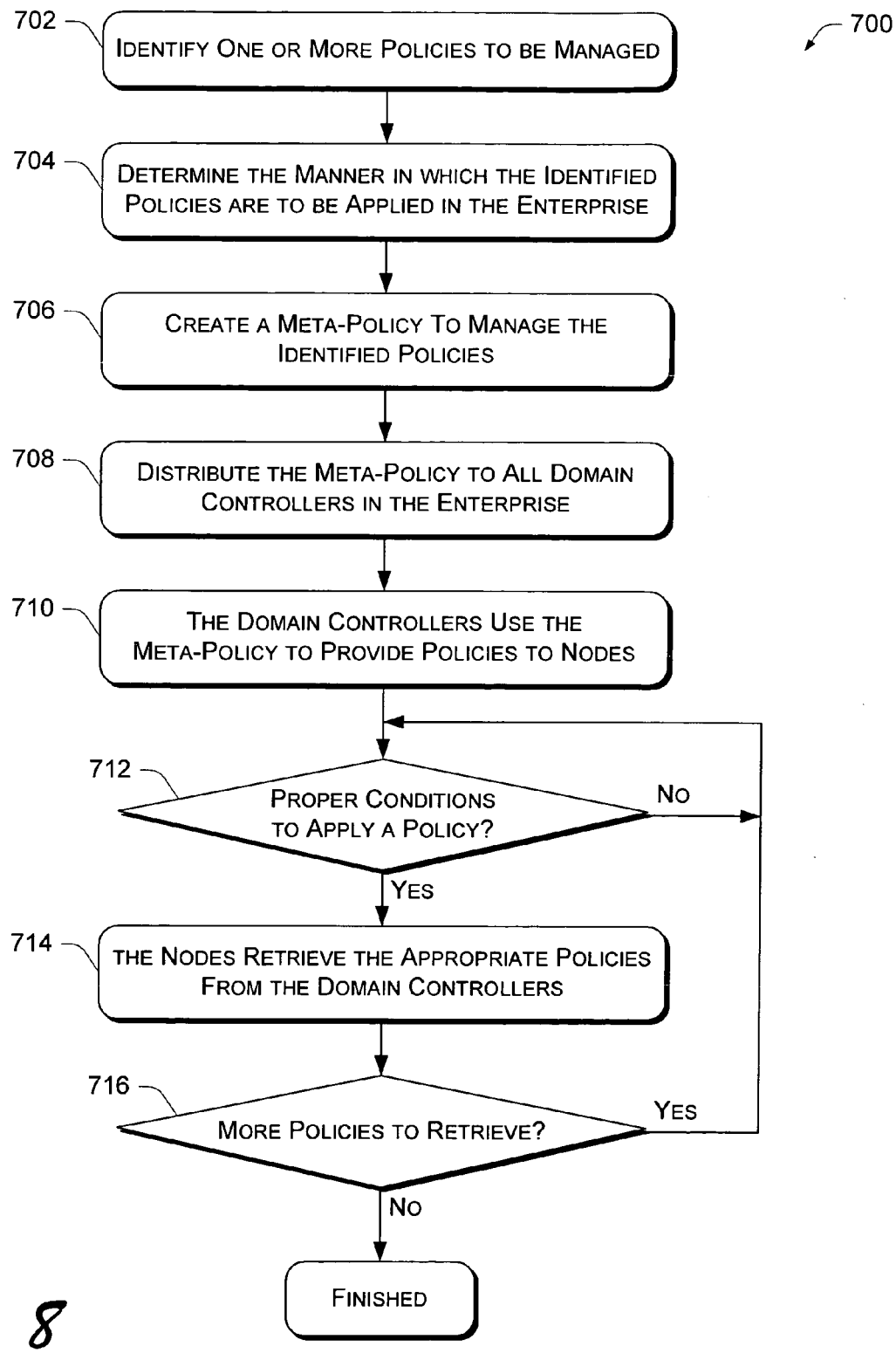
FIG. 8 is a flow diagram illustrating a procedure for handling meta-policies in an enterprise.

FIG. 8 is a flow diagram illustrating a procedure 700 for handling meta-policies in an enterprise. A meta-policy is a policy that is used to trigger and execute processes that administer policies in an enterprise. Meta-policies allow administrators to control, for example, the time at which a policy is applied to minimize possible disruption of the data communications throughout the enterprise. Once the administrator has created and distributed the meta-policy, the meta-policy is executed automatically by the system such that the administrator is not required to be involved when any of the meta-policy decisions are made on an ongoing basis.

Initially, an administrator or other user identifies one or more policies to be managed (block 702). These identified policies will be managed using a meta-policy. Management of a policy may include, for example, applying the policy, removing the policy, testing the policy, or storing the policy. Next, the procedure 700 determines the manner in which the identified policies are to be applied in the enterprise (block 704). This determination may include the time of day that the policies can be applied, such as late in the evening when data traffic throughout the enterprise is light. Alternatively, the application of one or more policies may depend on certain traffic parameters such that the policies are only applied when network traffic is low.

Next, the procedure 700 creates a meta-policy to manage the identified policies (block 706) based on the determinations made in block 704. The meta-policy is then distributed to all domain controllers in the enterprise (block 708). The domain controllers use the received meta-policy to provide policies to various nodes in the enterprise (block 710). In one embodiment, the meta-policy is implemented by the node. In this situation, the policy is implemented, for example, by the node policy provider. The meta-policy defines when and how particular policies are selected, retrieved, stored, applied, and removed. For example, a meta-policy may define that a laptop computer should retrieve policies each hour if it has a good connection (i.e., at least a particular bandwidth connection) to the domain controller. The meta-policy typically selects and stores policies locally. The meta-policy is applied at boot time for a particular node or system. A particular policy can be rolled back to a known good policy if a policy or an application fails.

Periodically, each managed node determines whether the proper conditions exist (based on the meta-policy) to apply a policy (block 712). If so, the managed node retrieves the policy from the domain controller (block 714). After applying the policy, the node determines whether additional policies remain to be retrieved and applied (block 716). If additional policies need to be retrieved, the procedure returns to block 712 to wait until the proper conditions exist to apply another policy.

A particular type of meta-policy is referred to as a "policy control policy". This policy control policy can be applied by an administrator or other user in the enterprise to prevent application of policies to a node or group of nodes until a later time. For example, a particular set of nodes (such as a group) is working properly, the owner of the group may want to avoid disturbance of the nodes until a later time when the set of nodes are less busy. If several administrators are applying policies throughout the enterprise, including this group of nodes, the policies may disrupt the proper operation of the group of nodes. In this situation, the owner of the group may apply a policy control policy to the group of nodes to temporarily prevent the administrators from causing new policies to be applied to any of the nodes in the group. For example, the owner may prevent the application of new policies until 2:00 a.m., when the group of nodes is not expected to be busy.

FIG. 9 illustrates an example of a suitable operating environment in which the policy handling systems and methods described herein may be implemented. The illustrated operating environment is only one example of a suitable operating environment and is not intended to suggest any limitation as to the scope of use or functionality of the invention. Other well-known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, network PCs, minicomputers, mainframe computers, distributed computing environments that include any of the above systems or devices, and the like.

FIG. 9 shows a general example of a computer 800 that can be used in accordance with the invention. Computer 800 is shown as an example of a computer that can perform the various functions described herein. Computer 800 includes one or more processors or processing units 802, a system memory 804, and a bus 806 that couples various system components including the system memory 804 to processors 802.

The bus 806 represents one or more of any of several types of bus structures, including a memory bus or memory controller, a peripheral bus, an accelerated graphics port, and a processor or local bus using any of a variety of bus architectures. The system memory 804 includes read only memory (ROM) 808 and random access memory (RAM) 810. A basic input/output system (BIOS) 812, containing the basic routines that help to transfer information between elements within computer 800, such as during start-up, is stored in ROM 808. Computer 800 further includes a hard disk drive 814 for reading from and writing to a hard disk, not shown, connected to bus 806 via a hard disk drive interface 815 (e.g., a SCSI, ATA, or other type of interface); a magnetic disk drive 816 for reading from and writing to a removable magnetic disk 818, connected to bus 806 via a magnetic disk drive interface 819; and an optical disk drive 820 for reading from and/or writing to a removable optical disk 822 such as a CD ROM, DVD, or other optical media, connected to bus 806 via an optical drive interface 823. The drives and their associated computer-readable media provide nonvolatile storage of computer readable instructions, data structures, program modules and other data for computer 800. Although the exemplary environment described herein employs a hard disk, a removable magnetic disk 818 and a removable optical disk 822, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 818, optical disk 822, ROM 808, or RAM 810, including an operating system 828, one or more application programs 830, other program modules 832, and program data 834. A user may enter commands and information into computer 800 through input devices such as keyboard 836 and pointing device 838. Other input devices (not shown) may include a microphone, joystick, game pad, satellite dish, scanner, or the like. These and other input devices are connected to the processing unit 802 through an interface 826 that is coupled to the system bus (e.g., a serial port interface, a parallel port interface, a universal serial bus (USB) interface, etc.). A monitor 842 or other type of display device is also connected to the system bus 806 via an interface, such as a video adapter 844. In addition to the monitor, personal computers typically include other peripheral output devices (not shown) such as speakers and printers.

Computer 800 operates in a networked environment using logical connections to one or more remote computers, such as a remote computer 846. The remote computer 846 may be another personal computer, a server, a router, a network PC, a peer device or other common network node, and typically includes many or all of the elements described above relative to computer 800, although only a memory storage device 848 has been illustrated in FIG. 9. The logical connections depicted in FIG. 9 include a local area network (LAN) 850 and a wide area network (WAN) 852. Such networking environments are commonplace in offices, enterprise-wide computer networks, intranets, and the Internet. In certain embodiments, computer 800 executes an Internet Web browser program (which may optionally be integrated into the operating system 828) such as the "Internet Explorer" Web browser manufactured and distributed by Microsoft Corporation of Redmond, Wash.

When used in a LAN networking environment, computer 800 is connected to the local network 850 through a network interface or adapter 854. When used in a WAN networking environment, computer 800 typically includes a modem 856 or other means for establishing communications over the wide area network 852, such as the Internet. The modem 856, which may be internal or external, is connected to the system bus 806 via a serial port interface 826. In a networked environment, program modules depicted relative to the personal computer 800, or portions thereof, may be stored in the remote memory storage device. It will be appreciated that the network connections shown are exemplary and other means of establishing a communications link between the computers may be used.

Computer 800 typically includes at least some form of computer readable media. Computer readable media can be any available media that can be accessed by computer 800. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 800. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A system comprising:
    memory;
    processor coupled to the memory;
    a windows management instrumentation module to collect and store event data, to manage different types of activities, to monitor event activity throughout an enterprise;
    a configuration tool coupled to the windows management instrumentation module to create policies and assign policies to a plurality of target nodes, wherein the policies are created for the enterprise;
    a trouble shooter tool coupled to the windows management instrumentation module to identify problems with policies or particular nodes;
    a planning tool coupled to the windows management instrumentation module to see effects on the policies;
    a policy provider coupled to the the windows management instrumentation module to distribute policies to the plurality of target nodes, wherein the policies distributed to the plurality of target nodes contain information known to the target nodes;
    the policy provider coupled to the plurality of target nodes to maintain policy information related to the at least one target node; and
    a domain controller coupled to configuration tool to receive the created policies, wherein the domain controller stores the policy information for the target nodes in the enterprise;
    wherein the policies may be replicated across domain controllers.

2. A system as recited in claim 1 wherein the configuration tool is further to create a meta-policy, wherein the meta-policy controls the application of policies to target nodes.

3. A system as recited in claim 1 further including a domain controller coupled to the first policy provider and coupled to the plurality of target nodes, wherein the domain controller controls the application of policies to the at least one target node.

4. A system as recited in claim 1 further including a simulation engine to simulate the results of applying a particular policy to at least one target node prior to actual application of the particular policy to the target node, wherein results of a simulation have no errors or serious conflicts between multiple policies are accepted.

* * * * *